Sept. 17, 1935.   J. N. GOOD   2,014,890
TRIPLE VALVE DEVICE
Filed Feb. 23, 1934
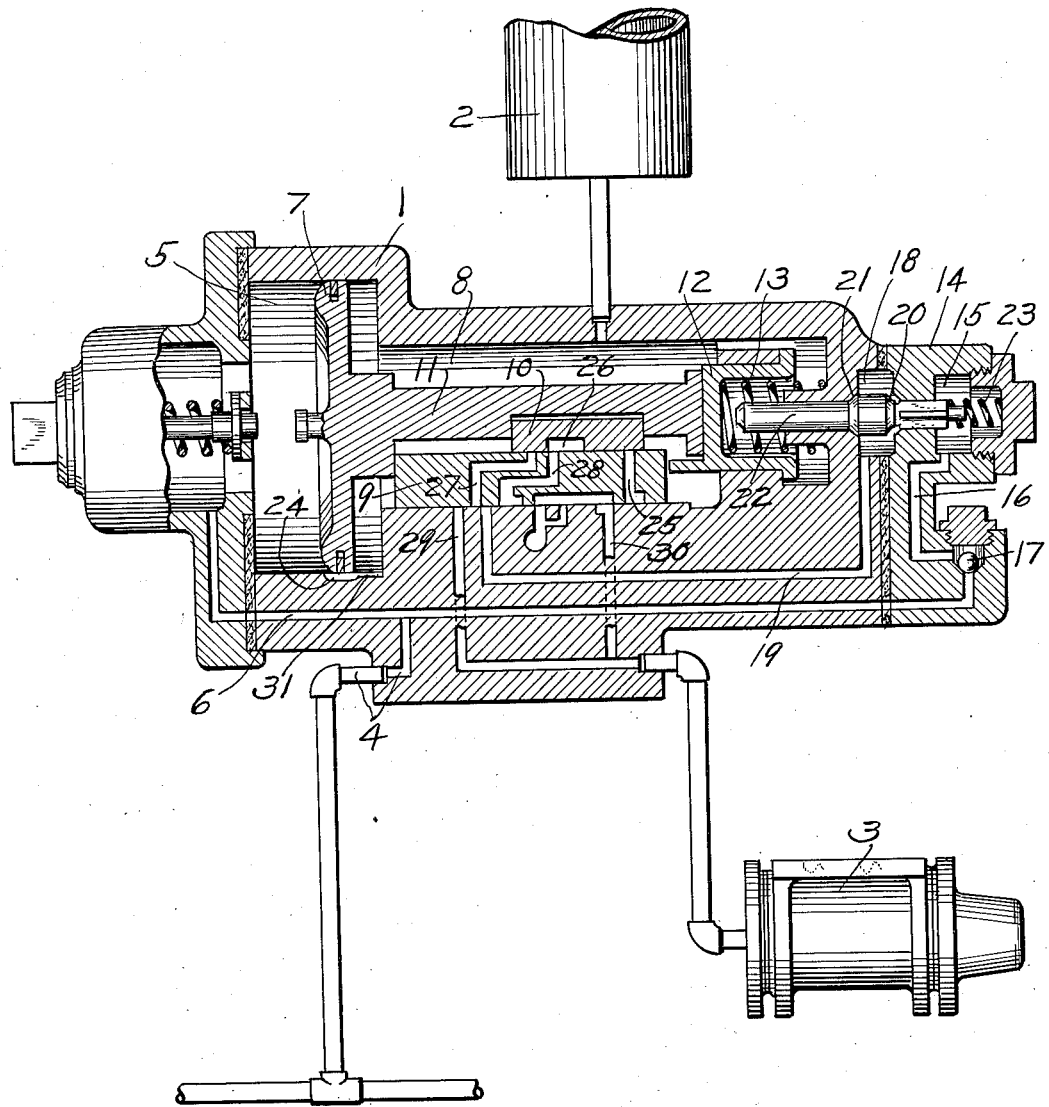
INVENTOR.
JOHN N. GOOD
BY *Wm. M. Cady*
ATTORNEY.

Patented Sept. 17, 1935

2,014,890

UNITED STATES PATENT OFFICE 2,014,890

TRIPLE VALVE DEVICE

John N. Good, Wilmerding, Pa., assignor to The Westinghouse Air Brake Company, Wilmerding, Pa., a corporation of Pennsylvania Application February 23, 1934, Serial No. 712,471

13 Claims. (Cl. 303—36)

This invention relates to fluid pressure brakes, and more particularly to a triple valve device for such brakes.

The triple valve device commonly employed for controlling the brakes is of the type having a quick service passage in continuous communication with the brake pipe and controlled by the triple valve slide valve, so that when the slide valve is in the quick service position, fluid is vented from the brake pipe through this passage to effect a local quick service reduction in brake pipe pressure. Said triple valve device is also of the retarded release type, having a normal full release position and an inner restricted, or retarded, release position, and in the retarded release position, the quick service passage is lapped by the triple valve slide valve. When an uncharged car equipped with this type of triple valve device is cut into a charged train, the triple valve device on the uncharged car will be operated to the retarded release position, due to the sudden increase in brake pipe pressure acting on the triple valve piston. This increase in brake pipe pressure will also be effective in the quick service passage, and since the slide valve chamber is uncharged at this time, the pressure of the fluid in the quick service passage acting on the under or seated face of the slide valve will lift it from its seat and permit dirt and scale to lodge between the valve and its seat. The presence of dirt and scale between the valve and its seat causes leakage and undue wear of the valve and seat and interferes with the proper operation of the valve device.

The object of the invention is to provide a triple valve device of the retarded release type, having means for preventing the slide valve of said device from being lifted from its seat, when in the retarded release position, by the pressure of the fluid in the quick service passage.

According to the invention, a valve is interposed in the quick service passage and so arranged as to be normally unseated, for permitting the free flow of fluid under pressure through said passage, when the triple valve device is in the quick service position, and seated when the triple valve device is in the retarded release position, so as to cut off the flow of fluid under pressure through said passage to the slide valve seat.

In the accompanying drawing, the single figure is a view of a car brake equipment including a triple valve device of the retarded release type shown in section, and embodying the invention, the parts being shown in the normal release position.

As shown in the drawing, the car fluid pressure brake equipment comprises a triple valve device 1, an auxiliary reservoir 2, a brake cylinder 3, and a brake pipe 4.

The triple valve device 1 comprises a casing having a piston chamber 5, connected to the brake pipe 4 through a passage 6 and containing a piston 7. The valve chamber 8 at the opposite side of the piston 7 is connected to the auxiliary reservoir 2 and contains a main slide valve 9 and a graduating slide valve 10, adapted to be operated through a piston stem 11 by the piston 7.

The triple valve device, being of the retarded release type, is provided with a retarded release stop member 12, the inner movement of which is opposed by a spring 13. The member 12 is adapted to oppose inward movement of the piston stem 11 and the main slide valve 9 from the normal release position to the retarded release position.

According to the invention, a casing 14 is carried by the triple valve device and has a chamber 15 which is provided with a passage 16 connecting with the brake pipe passage 4 and containing a check valve 17 for preventing a backflow of fluid from said chamber to the passage 4.

The casing 14 also has a valve chamber 18 provided with a passage 19 leading to the seat of the slide valve 9 and in which are mounted double beat valves 20 and 21. It should here be understood that the passages 16 and 19, taken together, constitute the usual quick service passage.

The valve 20 controls communication from chamber 15 to valve chamber 18. The valve 21 is provided with a stem 22 which extends through a bore provided in the triple valve casing into that portion of chamber 18 which is to the rear of the retarded release stop member 12, the end of said stem being normally spaced away from said member. It will thus be seen that valve 21 is adapted to close communication from chamber 18 to chamber 8. A spring 23 is provided to urge the valve 20 from its seat and the valve 21 to its seat, and the stem 22 is adapted to be engaged by the retarded release stop member, upon movement of the triple valve parts to retarded release position, for seating the valve 20.

In operation, when the brake pipe 4 is charged with fluid under pressure in the usual manner, the triple valve piston 7 is moved to the normal release position, as shown in the drawing, in which the feed groove 24 around the piston 7 is uncovered, permitting flow of fluid under pressure from the piston chamber 5 and the brake pipe to the slide valve chamber 8 and from thence to the auxiliary reservoir 2. Fluid under pressure is also supplied from the brake pipe to passage 19 through passage 16, past the check valve 17, chamber 15, past the unseated valve 20, and chamber 18. With the valve 21 held seated, communication is cut off from chamber 18 to the slide valve chamber 8, past the valve stem 22, so as to permit the feed groove 24 to control the charging of said valve chamber and the auxiliary reservoir.

When a reduction in brake pipe pressure is made to effect a service application of the brakes, the piston 7 is shifted outwardly, first closing off communication through the feed groove 24 and moving the graduating slide valve 10 relative to the main valve 9, so that the usual service port 25 in the main slide valve is uncovered and so that cavity 26 in the graduating slide valve connects ports 27 and 28 in the main slide valve 9. The movement of the piston 7, and consequently of the main slide valve 9, continues until these parts are in quick service position, in which the service port 25 registers with a passage 30 leading to the brake cylinder 3, for supplying fluid under pressure from the slide valve chamber 8, and the connected auxiliary reservoir 2, to the brake cylinder 3, and in which port 27 registers with a passage 29 leading to the brake cylinder 3 and also in which port 28 registers with passage 19.

Fluid under pressure is then vented from the brake pipe to the brake cylinder 3 through passage 16, past the check valve 17, thence through chamber 15, past the unseated valve 20, then through chamber 18, passage 19, port 28, cavity 26 in the graduating slide valve 10, and port 27 and passage 29. Thus, the usual well known local venting of fluid from the brake pipe to the brake cylinder is produced, so as to cause quick serial action throughout the train.

The check valve 17 is provided in passage 16 for the purpose of preventing a back-flow of fluid under pressure from the brake cylinder 3, and consequently from the auxiliary reservoir 2, to the brake pipe in the event that, while the triple valve parts are in quick service position, brake pipe pressure is reduced, as by an over-reduction effected through the usual brake valve device (not shown) or through leakage of fluid from the brake pipe, beyond the point of equalization between the brake cylinder and the auxiliary reservoir.

It should be noted that in the event that less than a full service application of the brakes is effected, the pressure of the fluid in chamber 18 will be higher than that in the slide valve chamber 8, but the valve 21 being held seated by the action of the spring 23, leakage from chamber 18 to chamber 8 is prevented.

When a car having an "empty" brake equipment is cut into a charged train, the rapid increase in brake pipe pressure on said car is effective in the triple valve piston chamber 5, with the result that the piston 7 is shifted to the inner or retarded release position, in which the quick service passage 19 is lapped by the slide valve 9. This movement of the piston causes the stop member 12 to be moved in a direction toward the right hand and during this movement said member first engages the valve stem 22 and then, through this engagement, causes the valve 20 to be seated, thereby closing off communication from chamber 15 to chamber 18.

As the above mentioned increase in brake pipe pressure is also effective in passage 16 and in the connected chamber 15, the seating of the valve 20 prevents fluid under pressure thus supplied to said chamber from flowing to chamber 18 and thence through passage 19 to the seated face of the slide valve 9. If the valve 20 were not provided for closing off communication from chamber 15 to chamber 18, then the rapid increase in brake pipe pressure would be effective in passage 19 and this pressure in said passage, acting on the seated face of the slide valve 9 would lift said slide valve from its seat, the fluid pressure acting on the opposite face being substantially at atmospheric pressure.

It will be noted that when valve 20 is seated, the valve 21 is unseated but this has no significance.

It will further be noted that when the triple valve piston is in retarded release position, fluid under pressure flows from the piston chamber 5 to the valve chamber 8 and the connected auxiliary reservoir 2 at a slow rate through the restricted feed groove 31 around the piston 7. When the auxiliary reservoir pressure in valve chamber 8 is increased to substantially the pressure of fluid in the piston chamber 5 the retarded release spring 13, acting through the medium of the stop member 12 on the slide valve 9 and acting through the medium of said member and the piston stem 11 on the graduating slide valve 10 will move the piston 7 and slide valves 9 and 10 to full release position.

In full release position of the triple valve parts, the stop member 12 is disengaged from the valve stem 22 and the spring 23 then acts to unseat the valve 29 and to seat the valve 21. With the valve 20 unseated, passage 19 is again in communication with passage 16, so that when the triple valve device is shifted to quick service position, fluid will again be vented from the brake pipe through said passages, as hereinbefore described. The seating of valve 21 cuts off communication from chamber 18 to valve chamber 8 so as to prevent charging of said valve chamber from chamber 18.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a triple valve device comprising a piston subject to variations in brake pipe pressure, a valve movable by said piston upon a reduction in brake pipe pressure to a position in which communication is established for venting fluid under pressure from the brake pipe through a passage and movable by said piston upon an increase in brake pipe pressure to a release position in which said passage is lapped by said valve, and means operated by said piston to close communication from the brake pipe through said passage.

2. In a fluid pressure brake, the combination with a brake pipe, of a triple valve device comprising a piston subject to variations in brake pipe pressure, a valve movable by said piston upon a reduction in brake pipe pressure to a position in which communication is established for venting fluid under pressure from the brake pipe through a passage and movable by said piston upon an increase in brake pipe pressure to a release position in which said passage is lapped by said valve, and valve means operable to close communication from the brake pipe through said passage upon movement of said piston to said release position.

3. In a fluid pressure brake, the combination with a brake pipe, of a triple valve device comprising a piston subject to variations in brake pipe pressure, a valve movable by said piston upon a reduction in brake pipe pressure to a position in which communication is established for venting fluid under pressure from the brake pipe through a passage and movable by said piston upon an increase in brake pipe pressure to a release position in which said passage is lapped by said valve, and valve means operated by said piston to close communication from the brake pipe through said passage upon movement of said piston to said release position.

4. In a fluid pressure brake, the combination with a brake pipe, of a triple valve device comprising a piston subject to variations in brake pipe pressure, a valve movable by said piston upon a reduction in brake pipe pressure to a position in which communication is established for venting fluid under pressure from the brake pipe through a passage and movable by said piston to a normal release position and also movable by said piston to an inner or retarded release position, said passage being lapped by said valve in said retarded release position, and a valve operated by said piston upon movement thereof from said normal release position to said retarded release position to close communication from the brake pipe through said passage.

5. In a fluid pressure brake, the combination with a brake pipe, of a triple valve device comprising a piston subject to the opposing pressures of the brake pipe and a chamber, a valve contained in said chamber and movable by said piston to a position in which communication is established for venting fluid under pressure from the brake pipe through a passage and movable by said piston to a release position in which said passage is lapped by said valve, and a valve having a stem extending into said chamber and adapted to be operated by said piston for actuating said valve to close communication from the brake pipe through said passage upon movement of said piston to said release position.

6. In a fluid pressure brake, the combination with a brake pipe, of a triple valve device comprising a piston subject to variations in brake pipe pressure, a valve movable by said piston to a position in which communication is established for venting fluid under pressure from the brake pipe through a passage and movable by said piston to a normal release position and also movable by said piston to an inner or retarded release position, said passage being lapped by said valve in said retarded release position, yielding resistance means for opposing movement of said valve from said normal release position to said retarded release position, and means operated by said yielding resistance means upon movement of said valve to said retarded release position to close communication from the brake pipe through said passage.

7. In a fluid pressure brake, the combination with a brake pipe, of a triple valve device comprising a piston subject to variations in brake pipe pressure, a valve movable by said piston to a position in which communication is established for venting fluid under pressure from the brake pipe through a passage and movable by said piston to a normal release position and also movable by said piston to an inner or retarded release position, said passage being lapped by said valve in said retarded release position, yielding resistance means for opposing movement of said piston from said normal release to said retarded release position, and a valve operated by said means upon movement thereof to said retarded release position to close communication from the brake pipe through said passage.

8. In a fluid pressure brake, the combination with a brake pipe, of a triple valve device comprising a piston subject to the opposing pressures of the brake pipe and a chamber, a valve contained in said chamber and movable by said piston to a position in which communication is established for venting fluid under pressure from the brake pipe through a passage and movable by said piston to a normal release position and also movable by said piston to an inner or retarded release position, said passage being lapped by said valve in said retarded release position, yielding resistance means contained in said chamber for opposing movement of said valve to said retarded release position, and a valve having a stem extending into said chamber and adapted to be engaged by said means for actuating said valve to close communication from the brake pipe through said passage upon movement of said means to said retarded release position.

9. In a fluid pressure brake, the combination with a brake pipe, of a triple valve device comprising a piston subject to variations in brake pipe pressure, a valve movable by said piston to a position in which communication is established for venting fluid under pressure from the brake pipe through a passage and movable by said piston to a release position in which said passage is lapped by said valve, yielding resistance means for opposing movement of said valve to said release position, and means operated by said yielding resistance means upon movement of said valve to said release position to close communication from the brake pipe through said passage.

10. In a fluid pressure brake, the combination with a brake pipe, of a triple valve device comprising a piston subject to variations in brake pipe pressure, a valve movable by said piston to one position in which communication is established for venting fluid under pressure from the brake pipe through a passage and movable by said piston to another position in which said passage is lapped by said valve, and means for closing communication from the brake pipe through said passage upon movement of said valve to the second mentioned position.

11. In a fluid pressure brake, the combination with a brake pipe, and a brake cylinder, of a triple valve device comprising a piston subject to variations in brake pipe pressure, a valve movable by said piston to one position in which communication is established for venting fluid under pressure from the brake pipe to said brake cylinder through a passage and movable by said piston to another position in which said passage is lapped by said valve, and means for closing communication from the brake pipe through said passage upon movement of said valve to the second mentioned position.

12. In a fluid pressure brake, the combination with a brake pipe, of a triple valve device comprising a casing containing a chamber and a piston subject to the opposing pressures of the brake pipe and said chamber, valve means contained in said chamber, a valve chamber in communication with said chamber through a bore in said casing and open to a passage controlled by said valve means, said valve means being movable by said piston to a position for venting said passage and movable to a release position in which said passage is lapped by said valve means, a valve seat surrounding said bore in said valve chamber, a valve contained in said valve chamber for controlling communication from the brake pipe to said valve chamber, another valve contained in said chamber and adapted to close communication from said valve chamber to the first mentioned chamber through said bore, a stem associated with the second mentioned valve and extending through said bore into the first mentioned chamber and adapted to be controlled by said piston, said stem being operated to move the second mentioned valve away from said seat and to seat the first mentioned valve upon movement of said piston to release position, and means for moving the second mentioned valve into engagement with said seat and to seat the first mentioned valve upon movement of said piston out of said release position.

13. In a fluid pressure brake, the combination with a brake pipe, of a triple valve device subject to variations in brake pipe pressure, a valve movable by said piston to a service position in which communication is established for venting fluid under pressure from the brake pipe through a passage and movable by said piston to a release position in which said passage is lapped by said valve, and means operated by said piston for closing communication from the brake pipe through said passage.

JOHN N. GOOD.